Feb. 21, 1956     C. L. CRADDOCK     2,736,005
TRUNK LIGHT AND WARNING FLASHER
Filed May 6, 1954     2 Sheets-Sheet 1
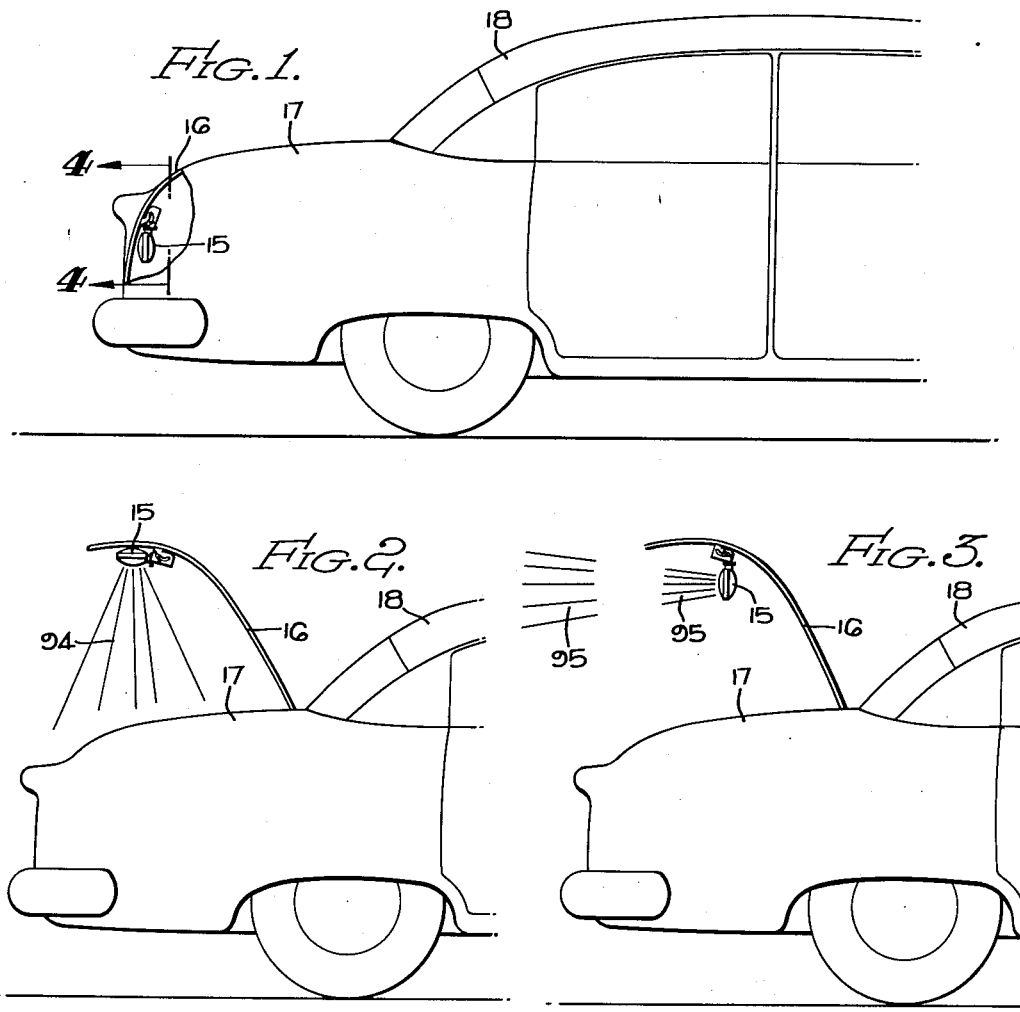
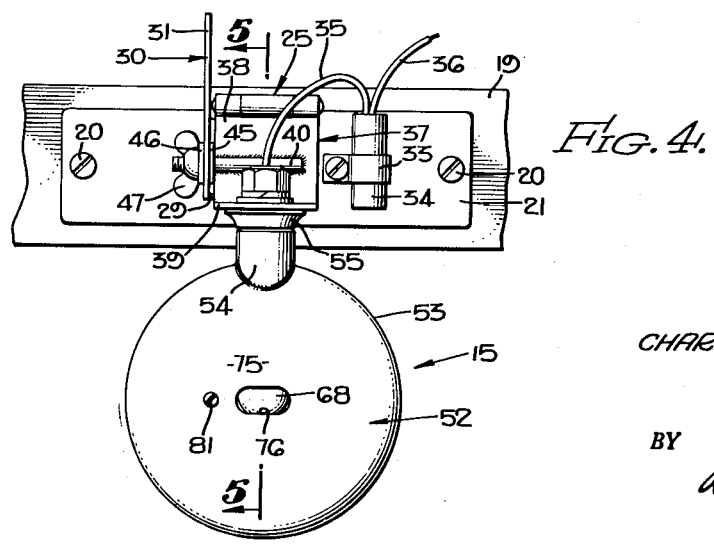
CHARLES L. CRADDOCK,
INVENTOR.
BY
ATTORNEY

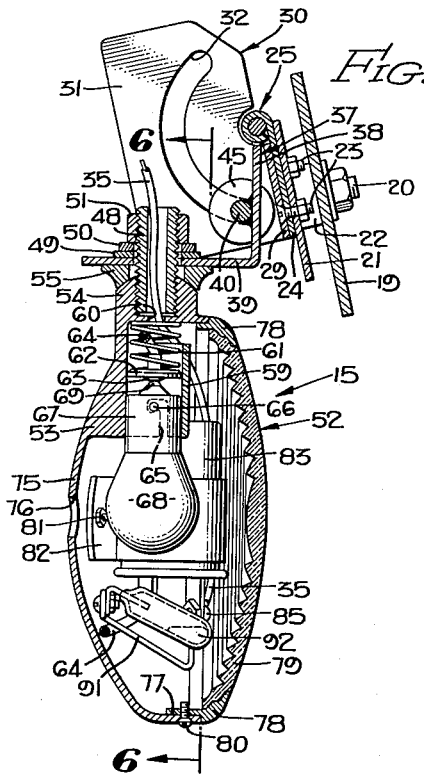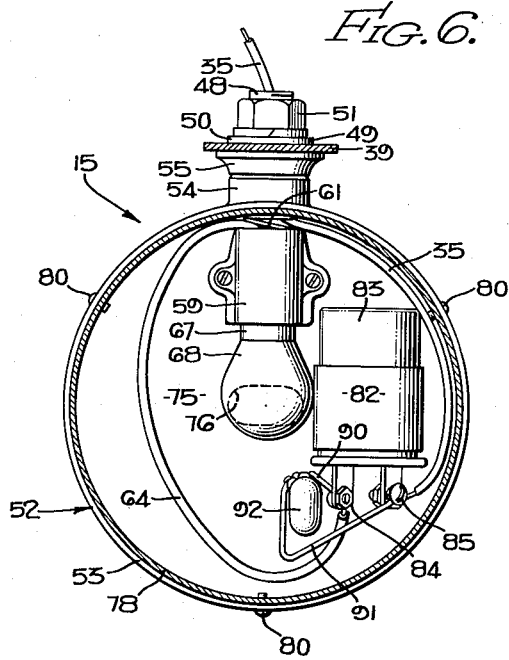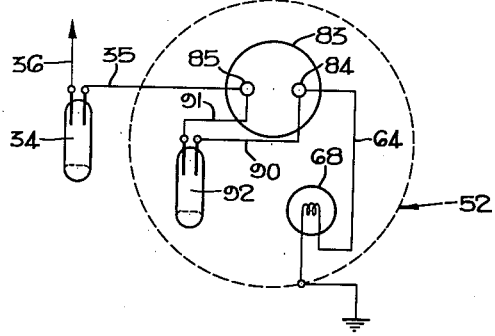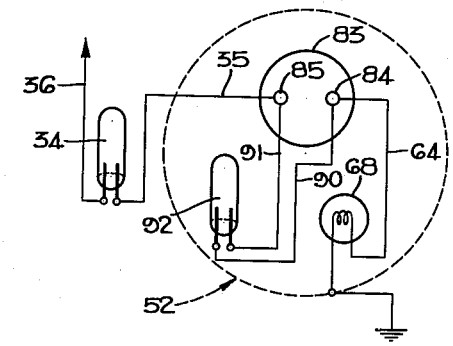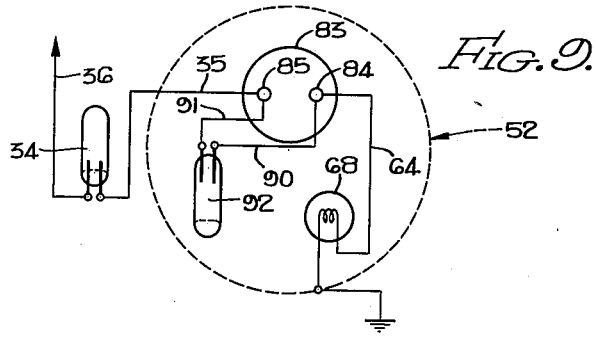

United States Patent Office 2,736,005
Patented Feb. 21, 1956

2,736,005

TRUNK LIGHT AND WARNING FLASHER

Charles L. Craddock, North Hollywood, Calif., assignor of one-half to J. E. Metcalf, Los Angeles, and one-half to Flasher Electronic Corporation, Los Angeles, Calif., a corporation of California Application May 6, 1954, Serial No. 428,008

3 Claims. (Cl. 340—87)

This invention relates to devices for illuminating the interior of the luggage trunk of an automobile.

It is an object of the invention to provide such a trunk light which is optionally operable to serve as a warning flasher.

It is another object to provide such a trunk light which may be converted from a trunk light into a combined trunk light and warning flasher light by a simple manipulation by the operator and reconverted back again by an equally simple reverse manipulation.

Yet another object is to provide a trunk light which lies flat against the inside face of the trunk lid of an automobile when functioning primarily as a trunk light, but which is swingable on its mounting to a different position enabling it to produce a flasher warning light of maximum size and intensity, and at a substantial elevation.

The manner of accomplishing the above objects as well as further objects and advantages will be made manifest in the following description taken in connection with the accompanying drawings in which Fig. 1 is a diagrammatic side elevational view of the rear end of an automobile partially broken away to illustrate the manner of mounting a preferred embodiment of the invention on the lid of the luggage trunk thereof, and showing said lid in closed position.

Fig. 2 is a view similar to Fig. 1 showing said lid in raised position with the invention functioning as a trunk light.

Fig. 3 is a view similar to Fig. 2 with the invention functioning as a warning flasher.

Fig. 4 is an enlarged elevational view of the invention taken on line 4—4 of Fig. 1.

Fig. 5 is an enlarged vertical sectional view taken on the line 5—5 of Fig. 4.

Fig. 6 is a vertical sectional view taken on the line 6—6 of Fig. 5.

Fig. 7 is a diagram of the electrical elements of the invention when the latter is positioned as in Fig. 1 and thereby completely de-energized.

Fig. 8 is a view similar to Fig. 7 and illustrates the invention as energized when positioned as shown in Fig. 2 to function as a trunk light.

Fig. 9 is a view similar to Fig. 8 and illustrates the invention energized when positioned as shown in Fig. 3 to function primarily as a warning flasher.

Referring specifically to the drawings, the invention is there shown as embodied in a trunk light 15 which is adapted to be mounted on the inside of a lid 16 of the luggage trunk 17 of an automobile 18. The lid 16 has a transverse structural member 19 embodied therewith upon which the trunk light 15 is mounted by a pair of bolts 20.

The trunk light includes a base plate 21 apertured at its opposite ends to receive the bolts 20 which also extend through spacer collars 22 and member 19 to bind said plate to said member in spaced relation therewith (Fig. 5).

Secured to plate 21 by bolts 23 is the back wing 24 of a hinge 25. Bolts 23 also extend through and secure to plate 21 a flange 29 of an angle plate 30, the other flange 31 of which has an arcuate slot 32 formed concentric with the axis of hinge 25.

Secured to plate 21 by a bracket 33 is a mercury gravity-operated switch 34 having terminal leads 35 and 36, the purpose of which will be explained later.

The hinge 25 has a front wing 37 forming right angle producing flanges 38 and 39. Welded on flange 38 in parallelism with the axis of hinge 25 and extending through the slot 32 is a threaded rod 40. Encircling the rod 40 between the flange 31 and flange 38 is a washer 45. Another such washer 46 is slipped over the extending end of rod 40 and a wing nut 47 screwed thereon to snugly compress the flange 31 and said washers between the nut and hinge flange 38.

The hinge flange 39 is apertured to receive a threaded pipe nipple 48 the outer end of which carries a washer 49, a lock washer 50, and a nut 51.

The trunk light 15 also includes a lamp unit 52, having a die-cast circular light metal housing 53 with an internally threaded neck 54 which screws tightly onto the lower end of nipple 48. The tightening of nut 51 thus compresses a centering washer 55, encircling said nipple, between neck 54 and hinge flange 39 and securely mounts unit 52 on said flange.

The housing 53 provides an inwardly opening lamp socket 59 which is aligned with neck 54 and connected with nipple 48 by a hole 60 in said neck. Confined in said socket is a coil spring 61 having a disc 62 of insulation material on its outer end, an electrical contact 63 connecting with a conductor wire 64 being provided centrally on said disc. The socket 59 has the usual bayonet slots 65 for receiving pins 66 of the lamp base 67 of a lamp 68 which is inserted into the socket 59 with the axial terminal 69 of said lamp engaging contact 63.

The housing 53 includes a shallow bell-shaped back wall 75 having a trunk lighting opening 76 disposed in alignment with the incandescent filament of lamp 68 on an axis normal to the longitudinal axis of the lamp 68, socket 59, and lamp unit neck 54.

The housing 53 also provides, on the opposite side of lamp 68 from opening 76, and coaxial with the latter, a flasher light opening 77. This opening is circular and coextensive with the rear end of said housing, and receives metal trim 78 of a plastic flasher lens 79 so that this lens is mounted in said opening by screws 80 extending through the housing into said trim.

Secured to the back wall 75 inside housing 53 by screws 81 is a bracket 82 which embraces a flasher unit 83 having terminal bolts 84 and 85. This flasher unit may be of any design suitable for performing the function to be described for it hereinafter but is preferably of the type disclosed in U. S. Patent No. 1,979,349 and currently being marketed under the trade-name of "Tung-Sol" Flasher No. 187S4.

Mounted on stiff conductors 90 and 91 secured to bolts 84 and 85, respectively, is a mercury gravity switch 92, said conductors connecting to the terminals of said switch.

Insulated wire conductor 64 connects terminal bolt 84 with lamp contact 63. Terminal lead 35 of mercury switch 34 extends into housing 53 through neck 54 thereof and connects with flasher unit terminal bolt 85. The other terminal lead 36 of switch 34 connects to the live terminal of the battery (not shown) of automobile 18, the other terminal of which is grounded and thus connected with lamp 68 through its grounded socket 59.

Operation

The operation of the invention is diagrammatically illustrated by Figs. 1, 2 and 3, and the respective corresponding wiring diagrams of Figs. 7, 8 and 9.

The lamp unit 52 is secured in its normal position (Figs. 1, 2, 4 and 5) by tightening wing nut 47. It is then allowed to remain in that normal position during normal circumstances, which is to say, as long as no emergency occurs requiring a warning flasher light.

As shown in Fig. 7, with lamp unit 52 in its normal position and with lid 16 closed, as in Fig. 1, the lamp 68 is de-energized by virtue of mercury switch 34 being opened by gravity.

Fig. 8 shows how the mere opening of lid 16, without changing the position of lamp unit 52 relative to the lid, closes both mercury switches 34 and 92 with the result that lamp 68 is continuously energized to direct a steady trunk illuminating light 94 downwardly through trunk light opening 76.

Thus the trunk 17 is automatically illuminated by lamp 68 whenever lid 16 is opened.

An emergency condition, such as might render a warning flasher light highly useful is generally found necessary in connection with tire repairs or other repairs being made by the automobile operator himself. To start such repairs necessitates his opening the trunk lid 16, as shown in Fig. 2.

Having opened this lid, and availed himself of the light 94 for getting from the trunk the tools, etc., needed for the work, the operator then reaches up, loosens the wing nut 47, and swings lamp unit 52 downward, as shown in Fig. 3. This brings the flasher light opening 77 and lens 79 into horizontal rearward alignment with lamp 68 and rocks mercury switch 92 a quarter turn thereby opening this switch causing the current in the circuit energizing lamp 68 to pass through flasher unit 83. An intermittent beam 95 of light of the color of lens 79 is thus emitted rearwardly from automobile 18 by the trunk light 15 which serves as a flasher warning signal of distress which will attract police patrol cars and cause passing motorists to exercise special care to avoid hitting the distressed operator.

The lens 79 is preferably red, but can be amber or any other color required by law to be used as a distress signal by a private automobile operator.

It is to be noted that a substantial illumination of the trunk 17 is provided by the light 94 emitted through opening 76 even with the latter aligned horizontally with lamp 68 as shown in Fig. 3. Thus lighted access may be had to the trunk 17 by the operator when the lamp unit 52 is giving out a flasher warning light 95 without his having to interfere with the latter.

While only a single embodiment of the invention is disclosed herein, for purposes of illustration, it is to be understood that various changes and modifications may be made in this without departing from the spirit of the invention or the scope of the appended claims.

The claims are:

1. In combination: a trunk light including a lamp, a housing therefor having light openings through which light may pass in opposite directions from said lamp, and a colored lens covering one of said openings; means for mounting said trunk light on the inner surface of the lid of the luggage trunk of an automobile toward the rear edge of said lid, which lid swings upwardly when opened thereby elevating said trunk light to a relatively high rearwardly exposed position and rotating said trunk light through an angle of approximately 90°, said trunk light normally lying close to said lid with the axis of said light openings disposed approximately horizontal when said lid is closed, said trunk light turning with said lid, as the latter opens, to turn said axis approximately to a vertical position with said lens covered light opening disposed upwardly and said other light opening disposed downwardly; a switch responsive to said opening of said lid to energize said lamp to cause light passing downward through said other light opening to illuminate said luggage trunk; a flasher switch; and a third switch operable by rotating said trunk light about its pivotal axis approximately 90° for introducing said flasher switch in the circuit of said lamp, said rotation of said trunk light shifting said light opening axis to a substantially horizontal position and causing said lens to face rearwardly whereby said lamp is intermittently energized causing said lens to emit a flashing warning light rearwardly from said automobile.

2. A combination as in claim 1 in which said first switch comprises a mercury switch mounted on the mounting means for said trunk light and thus swings with said lid when the latter is opened so as to close said mercury switch and illuminate said lamp, and in which said flasher switch and said third switch are mounted in said trunk light housing, and in which said flasher switch is connected in series with said lamp, and in which said third switch is a mercury switch connected in shunted relation with said flasher switch, and in which said third switch is open when said light opening axis is disposed horizontally and closed when said light axis is disposed vertically.

3. A combination as in claim 1 in which manual means is provided on said trunk light mounting means for setting said trunk light in a position in which the latter lies close to said lid with said light axis in a horizontal position when said lid is closed and retaining said trunk light in this relation to said lid when the lid is open excepting when, with said lid open, said setting means is manually released to permit said trunk light to swing downwardly to bring said light opening axis into horizontal position.

References Cited in the file of this patent

UNITED STATES PATENTS

| | | |
|---|---|---|
| 1,291,625 | Palmer | Jan. 14, 1919 |
| 2,102,967 | Neel | Dec. 21, 1937 |
| 2,146,701 | Peterson | Feb. 7, 1939 |
| 2,218,442 | Thurber | Oct. 15, 1940 |
| 2,344,129 | Clayton | Mar. 14, 1944 |
| 2,640,980 | Prupis | June 2, 1953 |